United States Patent
Dai et al.

(10) Patent No.: US 12,446,013 B2
(45) Date of Patent: Oct. 14, 2025

(54) SYSTEMS AND METHODS OF SCHEDULING WITH OFFSET

(71) Applicant: ZTE CORPORATION, Guangdong (CN)

(72) Inventors: Jianqiang Dai, Shenzhen (CN); Nan Zhang, Shenzhen (CN)

(73) Assignee: ZTE Corporation, Shenzhen (CN)

(*) Notice: Subject to any disclaimer, the term of this patent is extended or adjusted under 35 U.S.C. 154(b) by 264 days.

(21) Appl. No.: 18/374,306

(22) Filed: Sep. 28, 2023

(65) Prior Publication Data
US 2024/0032003 A1    Jan. 25, 2024

Related U.S. Application Data

(63) Continuation of application No. PCT/CN2021/085339, filed on Apr. 2, 2021.

(51) Int. Cl.
*H04W 72/0446* (2023.01)
*H04W 72/1268* (2023.01)

(52) U.S. Cl.
CPC ... *H04W 72/0446* (2013.01); *H04W 72/1268* (2013.01)

(58) Field of Classification Search
CPC ............. H04W 72/0446; H04W 72/1268
See application file for complete search history.

(56) References Cited

U.S. PATENT DOCUMENTS

2020/0252895 A1   8/2020  Yi et al.
2024/0163825 A1*  5/2024  Park ............ H04W 72/20

FOREIGN PATENT DOCUMENTS

CN      110474753 A     11/2019
WO    WO-2020/041182 A1  2/2020
WO    WO-2020/231831 A1  11/2020
WO    WO-2021/034779 A1  2/2021

OTHER PUBLICATIONS

Ya-Ju Yu, 'Offset-Aware Resource Allocation in NB-IOT Networks', IEEE Internet of Things Journal, vol. 9, No. 23, Dec. 1, 2022, pp. 23967-23980. (Year: 2022).*
R1-2101042, CMCC, 'Discussion on timing relationship enhancements for NTN', 3GPP TSG RAN WG1 #104-e, Jan. 25-Feb. 5, 2021, 8 pages. (Year: 2021).*
International Search Report and Written Opinion for PCT Appl. No. PCT/CN2021/085339, mailed Jan. 4, 2022 (7 pages).
First Office Action for CN Appl. No. 202410537669.8, dated Aug. 28, 2024 (with English translation, 10 pages).
Notification to go through Formalities of Registration and Notification to Grant Patent Right for Invention on Chinese Patent Application No. 2024105376698, dated Jan. 7, 2025 (4 pages, including English translation).

* cited by examiner

*Primary Examiner* — Melvin C Marcelo
(74) *Attorney, Agent, or Firm* — Foley & Lardner LLP (57) ABSTRACT

A wireless communication method comprises determining, by a wireless communication device, a slot based on a first offset; and sending, by the wireless communication device to a wireless communication node, an uplink transmission at the slot.

14 Claims, 6 Drawing Sheets

| | Time Relationships | Is Scheduling Offset Enlarged? | Solution Alternatives |
|---|---|---|---|
| 1 | RAR grant to NPUSCH format 1 | Yes | Alt 1: UE transmits in the available UL resource based on using K_offset. Alt. 2: UE transmits in the available UL resource based on reusing legacy signaling. |
| 2 | NPDCCH to NPUSCH format 1 | | |
| 3 | NPDSCH to HARQ-ACK on NPUSCH format 2 | | |
| 4 | NPDCCH order to NPRACH | Yes | No modification is needed (implicitly handled by available resource) |

FIG. 6

| | Time Relationships | Is Scheduling Offset Enlarged? | Solution Alternatives |
|---|---|---|---|
| 1 | MPDCCH to PUSCH | Yes | Alt 1: UE transmits in the available UL resource based on reusing K_offset |
| 2 | RAR grant to PUSCH | Yes | Alt 1: UE transmits in the available UL resource based on using K_offset. Alt. 2: UE transmits in the available UL resource based on reusing legacy signaling. Or no modification is needed (implicitly handed by available resource) |
| 3 | PDCCH order to PRACH | Yes | No modification is needed (implicitly handled by available resource) |
| 4 | CSI reference resource timing | Yes | Alt 1: UE transmits in the available UL resource based on reusing K_offset. |
| 5 | MPDCCH to aperiodic SRS | | |
| 6 | PDSCH to HARQ-ACK on PUCCH | Yes | Alt 1: UE transmits in the available UL resource based on using K_offset. Alt. 2: UE transmits in the available UL resource based on reusing legacy signaling. |

SYSTEMS AND METHODS OF SCHEDULING WITH OFFSET

CROSS-REFERENCE TO RELATED APPLICATION

This application claims the benefit of priority under 35 U.S.C. § 120 as a continuation of International Patent Application No. PCT/CN2021/085339, filed on Apr. 2, 2021, the disclosure of which is incorporated herein by reference in its entirety.

TECHNICAL FIELD

The disclosure relates generally to wireless communications and, more particularly, to systems and methods for scheduling uplink transmission with an offset.

BACKGROUND

Generally, the timing relationship as currently defined in 5G New Radio (NR) does not work well in the Internet of Things over Network-to-Network due to a large Timing Advance effect, nor does the timing relationship work well with Base Station scheduling because there may be a collision if the Base Station has no knowledge of a value of the Timing Advance experienced by the User Equipment. Furthermore, in some situations the Timing Advance between Uplink and Downlink channels is so large that the slot in which the User Equipment transmits the signal is before the slot in which the Base Station sends the scheduling/grant Downlink Control Information, which is theoretically impossible because the User Equipment must receive scheduling information before transmitting according to the scheduling information.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In some arrangements, User Equipment (UE) performs a method including determining a slot based on a first offset or on a configurable offset; and sending, to a wireless communication node, an uplink transmission at the slot.

In other arrangements, BS performs a method including configuring, for a wireless communication device, a slot for an uplink transmission, wherein the slot is determined based on a first offset or on a configurable offset.

In other embodiments, a wireless communications apparatus comprising a processor and a memory, wherein the processor is configured to read code from the memory and implement a method including determining a slot based on a first offset or on a configurable offset; and sending, to a wireless communication node, an uplink transmission at the slot.

In other embodiments, a computer program product comprising a computer-readable program medium code stored thereupon, the code, when executed by a processor, causing the processor to implement a method including determining a slot based on a first offset or on a configurable offset; and sending, to a wireless communication node, an uplink transmission at the slot.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Generally, the timing relationship as currently defined in 5G New Radio (NR) does not work well in Internet of Things (IoT) over Network-to-Network (NTN) due to large Timing Advance (TA) effect, nor does the timing relationship work well with Base Station (BS) scheduling because there may be a collision if the BS has no knowledge of a value of the TA experienced by the User Equipment (UE).

In addition to the IoT over NTN and Half-Duplex Frequency Division Duplex (HD-FDD) scheduling issues, multiple other specific timing relationships are present in the current 5G NR systems. For a Narrow Band (NB)-IoT system, there are: a) Narrowband Physical Downlink Control Channel (NPDCCH) to Narrowband Physical Uplink Scheduling Channel (NPUSCH) format 1; b) Random Access Response (RAR) grant to NPUSCH format 1; c) Narrowband Physical Downlink Scheduling Channel (NPDSCH) to HARQ-Acknowledgement (ACK) on NPUSCH format 2; d) NPDCCH order to Narrowband Physical Random Access Channel (NPRACH); and e) TA Command Activation. For an Enhanced Machine Type Communication (eMTC) system, there are: a) MTC Physical Downlink Control Channel (MPDCCH) to PUSCH; b) RAR grant to PUSCH; c) Physical Downlink Control Channel (PDCCH) order to Physical Random Access Channel (PRACH); d) MTC Physical Downlink Control Channel (MPDCCH) to scheduled UL Sounding Reference Signal (SRS); e) PDSCH to HARQ-ACK on PUCCH; f) Channel State Information (CSI) reference resource timing; g) MPDCCH to aperiodic SRS; and h) TA command activation. For example, in NPDCCH to NPUSCH format 1 (which is part of the NB-IoT system), upon detection on a given serving cell of a NPDCCH with DCI format N0 ending in NB-IoT Downlink (DL) subframe n intended for the UE, the UE performs, at the end of n+$k_0$ DL subframe for FDD, a corresponding NPUSCH transmission using NPUSCH format 1 in N consecutive NB-IoT Uplink (UL) slots $n_i$ with i=0, 1, . . . , N−1 according to the NPDCCH information.

Figure 6:
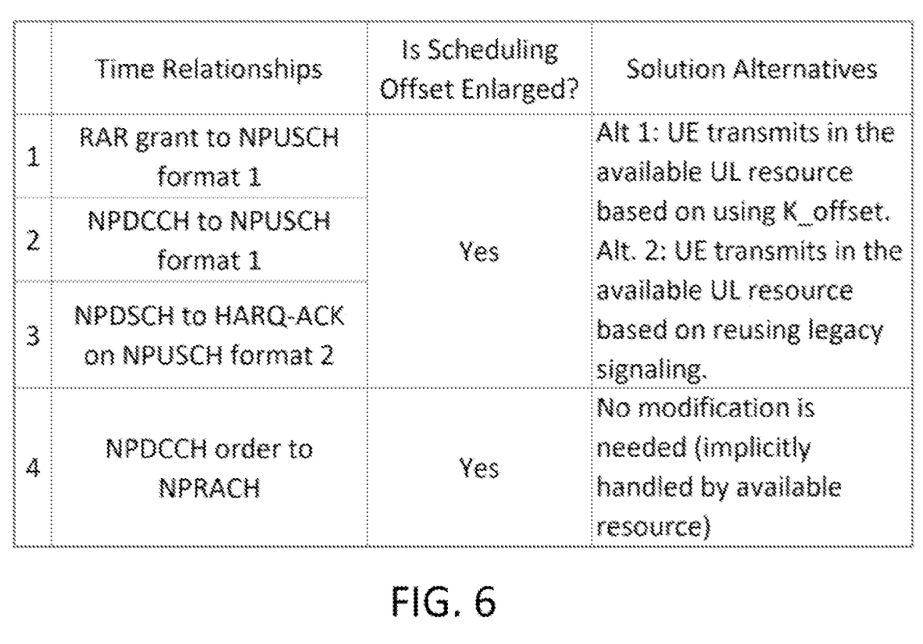
FIG. 6 is a table summarizing the enhancements to the timing relationships in NB-IoT as described herein, according to various embodiments.

In order to address the above issues, the systems and methods described herein are directed to various embodiments for modifying the current scheduling method. In a first embodiment, a scheduling offset value is enlarged and an available UL resource at or after the slot n+k+offset is determined (i.e., in some cases, the first available UL resource is slot n+k+offset, and in some cases, for NPUSCH repetition, the available UL slot is the first slot of NPUSCH). FIG. 6 is a schematic diagram of a scheduling method for a UE, according to the first embodiment. As shown in FIG. 6, a first available UL resource following the slot n+k+offset on the UE UL timeline does not overlap with any DL receiving, even with a large TA.

In a first case of this first embodiment, the UE transmits in the available UL resource at or after the slot n+k+offset. Assuming the received NPDCCH ended in slot n, with the assistance of a reported TA, the available UL resource may be the slot n+k+offset or after slot n+k+offset. For NPUSCH repetition, the available UL slot is the first slot of NPUSCH. In that way, the UE DL-UL timing interaction still holds even for a large TA. At the same time, the available resource scheduled by eNB can ensure no DL-UL collision at UE side happens, otherwise, the eNB may adjust DL scheduling or defer the UL scheduling time resource.

In order for this to occur, two things must be true: the BS and UE each need to know the value of offset, and the BS needs to know how to avoid DL-UL collision at the UE side. In order to know the value of offset, for a UE or eNB: a) the value of offset is determined based on at least a Timing Advance (TA) parameter or whether the slot is an uplink resource. This TA parameter includes at least one of: a common TA, a TA value, which should be applied for the UL slot for transmission, or a TA reported from UE to BS; b) both the BS and UE re-use the configuration of offset from initial access; or c) the value of offset is reconfigured via UE-specific signalling or group UE signalling. For initial access, both the BS and UE can know the value of offset: a) via implementation way, where both the BS and UE are preconfigured with a value for offset, which may be based on scenario (e.g., once the IoT-NTN UE accesses a GEO satellite network, the BS and UE will adopt the corresponding preconfigured value); orb) via signalling an offset (e.g., for RAR grant to NPUSCH format 1 in NB-IoT over NTN and RAR grant to PUSCH in eMTC over NTN, the BS determines the offset based on the cell/beam(s) deployment, and signals the value of offset). If the offset is determined via signaling, the value is determined according to the TA reported from eNB. In some case, the reported TA is carried in at least Msg 3 or (N)PUSCH transmission.

In some cases (e.g., long UL transmission that consists of multiple segments), the reported TA refers to at least the first TA or last TA value applied for one UL transmission carrying the TA. In other cases, the TA value can be one of the values applied by the (N)PUSCH segments.

In a second case of the first embodiment, the UE transmits in an available UL resource at or after slot n+k' (i.e., in some cases the slot n+k' is the available UL resource, and in other cases, for NPUSCH repetition, the available UL slot is the first slot of NPUSCH). The UE can also transmit in the available UL resource after the end of slot n+k'−1, where the value of k' is an extension value of existing values for k. In that way, the UE DL-UL timing interaction holds even for large TA. Meanwhile, a UE can transmit the NPUSCH/PUSCH in available UL resource after slot n+k', so that no DL-UL collision happens. For this case, UE/BS determines the slot to be n+configurable offset (e.g., k') or an available slot after n+configurable offset (e.g., k'). Here, n represents a slot where the UE receives downlink scheduling information from the eNB. The configurable offset is determined according to a function of a TA parameter. In some embodiments, the function is configured to convert a unit of the TA parameter to one of 1 millisecond, 1 slot, and 1 subframe. In other embodiments, there are other functions that convert TA into a configurable offset (e.g., with a different unit). This TA parameter includes at least one of a common TA, a TA value, which should be applied for the UL slot for transmission, or a TA reported from wireless communication device to wireless communication node. The reported TA is carried in at least Msg 3 or (N)PUSCH transmission, and refers to at least the first TA or last TA value applied for one UL transmission carrying the TA. In other embodiments, the TA value can be one of the values applied by the (N)PUSCH segments.

In some cases, a UE determines the configurable offset according to an indicator in Downlink Control Information (DCI) or Random Access Response (RAR) grant received from the eNB. The tables below include values for configurable offset that correspond to the indicator in DCI or RAR grant. Each state of the indicator refers to a value of configurable offset. In some cases, high layer signaling indicates which table of values should be applied for NTN.

In this second example, the key is how to preconfigure the candidate value of k'. In a first option, k' absorbs the value of f(TA), where f(TA) is derived from TA (e.g., common TA, TA applied for transmission, reported TA). For example, f(TA) executes the function of converting a unit of TA into 1 ms/slot/subframe (e.g., the granularity of k' may be 1 ms). In a second option, the value of the offset is reused from initial access and configured in accordance with the following tables based on an indicator (i.e., $I_{Delay}$) in either DCI or RAR grant. A value for k' as a function of $I_{Delay}$ for DCI format N0 for FDD is shown in the following Table 1:

TABLE 1

| $I_{Delay}$ | k' |
|---|---|
| 0 | 8 + f(TA) |
| 1 | 16 + f(TA) |
| 2 | 32 + f(TA) |
| 3 | 64 + f(TA) |

A value for k' as a function of $I_{Delay}$ for k' for DCI format N0 for FDD is shown in the following Table 2:

TABLE 2

| $I_{Delay}$ | k' |
|---|---|
| 0 | 8 + offset |
| 1 | 16 + offset |
| 2 | 32 + offset |
| 3 | 64 + offset |

For initial access (i.e., before the UE has accessed the BS), a value for k' is predetermined. For example, for RAR grant to NPUSCH format 1 in NB-IoT over NTN and RAR grant to PUSCH in eMTC over NTN, the candidate value of k' may be based on the connection type (e.g., Geostationary Orbits (GEO) or Low Earth Orbit (LEO)). For example, once the IoT-NTN UE accesses a GEO satellite network, the value for k' can be determined in the following Table 3 for k' for RAR grant to NPUSCH format 1:

TABLE 3

| $I_{Delay}$ | k' |
|---|---|
| 0 | x1 |
| 1 | x2 |
| 2 | x3 |
| 3 | x4 |

Furthermore, the value of k' is larger than the sum of maximum RTD and a legacy value of k, and the granularity of k' may be 1 ms. Higher layer signaling indicates which table is to be applied. For example, in an embodiment in which the RTD is 41.77 ms (i.e., LEO-1200), the following Table 4 for k' for RAR grant to NPUSCH format 1 is used:

TABLE 4

| $I_{Delay}$ | k' |
|---|---|
| 0 | 54 |
| 1 | 58 |
| 2 | 74 |
| 3 | 106 |

In some cases in which the DCI/RAR is enhanced, more bits are used for the indicator of configurable offset. When more states are included (e.g., 8 states are in the table), each state of the indicator indicate a value of k', then more values can be used for flexible scheduling.

In a second embodiment, a scheduling offset value is enlarged and an available UL resource at or after the slot n'+k is determined (i.e., in some cases, the first available UL resource is slot n'+k, and in some cases, for NPUSCH repetition, the available UL slot is the first slot of NPUSCH). In a first case of the second embodiment, the UE transmits the available UL resource at or after the slot n'+k (i.e., after the end of slot n'+k−1). For example, n'=n+f(TA), where f(TA) derives from TA (e.g., common TA, reported TA).

Figure 1:
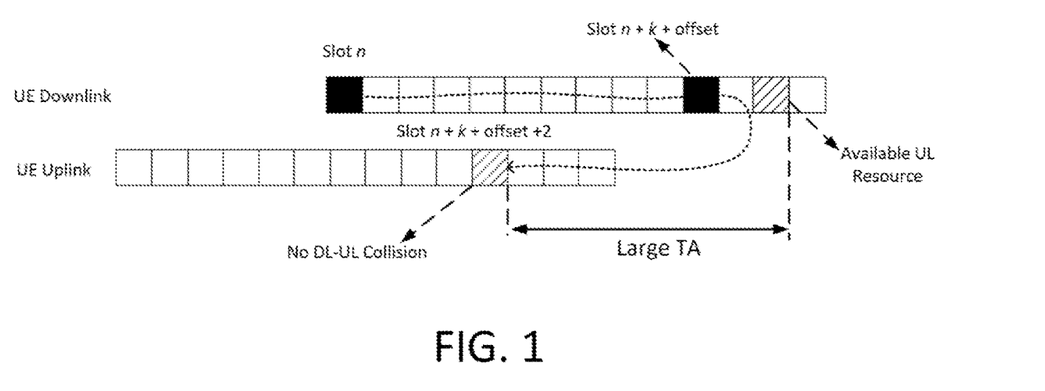
FIG. 1 is a schematic diagram of a scheduling method for a User Equipment, according to an example embodiment.
Figure 2:
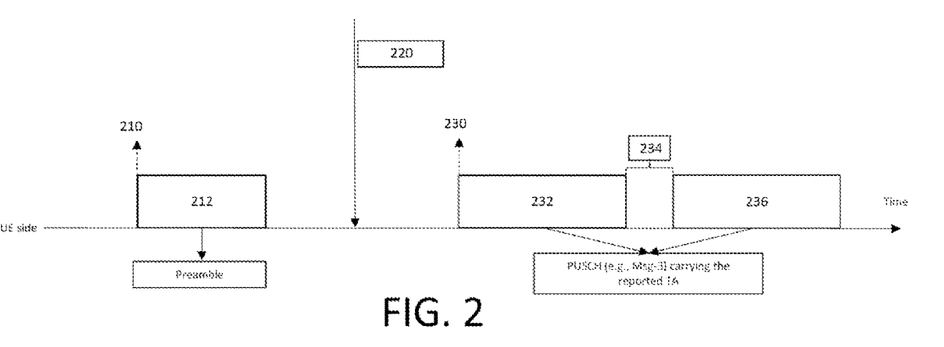
FIG. 2 is a schematic diagram illustrating a process for wireless communication for a UE, according to various embodiments.

In some cases for long repetition UL transmission, different TA may be executed in different segments/portions. FIG. 2 is a schematic diagram illustrating a process for wireless communication for a UE, according to various arrangements. As shown in FIG. 2, the UE conducts a preamble transmission 210, and receives a DL RAR 220, and then conducts a PUSCH or NPUSCH (e.g. Msg-3) transmission 230 that carries a reported TA. The transmission 230 contains 2 portions: a first portion 232 that executes a first TA (i.e., TA_1), and a second portion 236 that executes a second TA (i.e., TA_2). A gap 234 between two portions can be configured (e.g., which transmission is required for TA determination). The embodiment shown in FIG. 2 is a use case of Msg 3 transmission in which different TA are executed for different segments, with on TA being reported via Msg 3. In some cases, a TA value is reported as one of the values executed by the PUSCH segments. In other cases, a reported TA refers to at least the first TA or last TA value applied for one UL transmission carrying the TA. The UL transmission carrying the TA could be the PUSCH transmission as shown in FIG. 2. In some cases, the value of offset can be derived from the reported TA.

Figure 3:
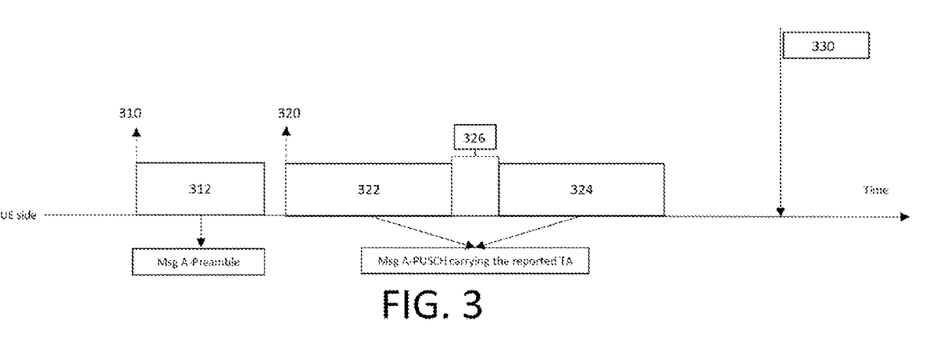
FIG. 3 is a schematic diagram illustrating a process for wireless communication for a UE, according to various embodiments.

FIG. 3 is a schematic diagram illustrating a process for wireless communication for a UE, according to various arrangements. As shown in FIG. 3, a UE transmits a first UL transmission 310, which includes a preamble 312. The UE then transmits a second UL transmission 320, which has two segments: a first segment 322 that executes a first TA (i.e., TA_1), and a second segment 324 that executes a second TA (i.e., TA_2). There is a gap 326 between the first and second segments. The second transmission 320, as shown in FIG. 3, is a Msg A-PUSCH that carries a reported TA. The UE then receives a DL transmission 330, which may be a Msg B. The embodiment shown in FIG. 3 is a use case of Msg A transmission, in which TA is reported via normal PUSCH, NPUSCH, etc.

Figure 4:
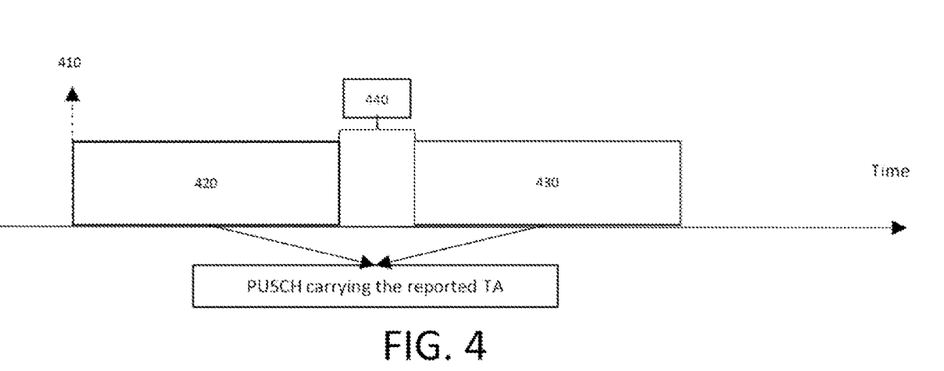
FIG. 4 is a schematic diagram illustrating a process for wireless communication for a UE, according to various embodiments.

FIG. 4 is a schematic diagram illustrating a process for wireless communication for a UE, according to various arrangements. As shown in FIG. 4, a UL transmission 410 is a PUSCH carrying a reported TA and includes two segments: a first segment 420 that executes a first TA (e.g., TA_1) and a second segment 430 that executes a second TA (e.g., TA_2). There is a gap 440 between the first segment 420 and second segment 430. The embodiment shown in FIG. 4 is a use case of PUSCH transmission in which different TA are executed for different PUSCH segments, with one TA is reported via PUSCH.

In some cases, periodic reporting of the TA is conducted via PUSCH.

Figure 5:
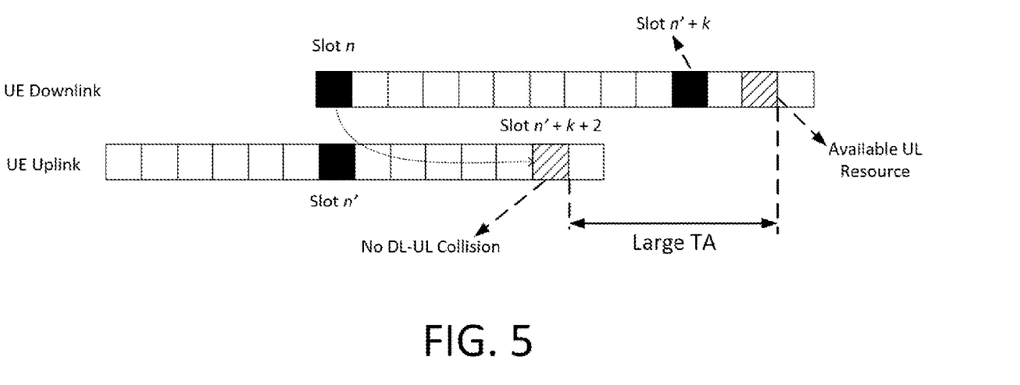
FIG. 5 is a schematic diagram illustrating a process for frame timing not aligning for a UE, according to various embodiments.

In another example in which PDCCH ends in slot n, rather than transmitting the PUSCH in slot n+k, the UE transmits the PUSCH in an available UL resource after slot n'+k. Specifically, slot n' corresponds to the DL slot n in time (when taking into account the TA). That is, if the frame boundary of UE DL-UL is aligned, then UL slot n' starts at the same time as DL slot n. However, if the frame boundary of UE DL-UL is not aligned, then UL slot n' is the slot that starts a time interval T after the start of DL slot n (where T is less than 1 slot). FIG. 5 is a schematic diagram illustrating a process for frame timing not aligning for a UE, according to the second embodiment. As shown in FIG. 5, slot n' on the DL timeline corresponds to slot n on the UL timeline, and the PUSCH is transmitted in a slot in the UE UL timeline that corresponds to a slot on the DL timeline that is later than slot n'+4 (when k=4). In this way, the UE DL-UL timing interaction still holds even with a large TA. Furthermore, the BS is able to select a next UL resource as the available UL resource (i.e., defer the scheduling time resource) if the BS determines that the presently selected UL resource would lead to a DL-UL collision.

In a third embodiment, the UE follows PDCCH monitoring constraint(s) in order to avoid a DL-UL collision at UE side. If an offset is introduced into timing relationship of NPUSCH format 1 scheduling, in order to keep consistent with current constraint, like "After receiving one UL grant, NB-IoT UE is required to continue monitoring any NPDCCH search spaces containing candidates ending at least 2 ms before the start of the first NPUSCH format 1". Then an offset should be introduced, such as "the UE is not required to monitor an NPDCCH candidate in any subframe starting from subframe n+k−2+offset to subframe n+k−1+offset." Where the subframe n+k−2+offset, subframe n+k−1+offset is interpreted as UE UL subframe #.

In a fourth embodiment, after the UE is finished transmitting NPUSCH, the UE may monitor DCI in Discontinuous Reception (DRX) mode in order balance power saving and signalling receiving/updating into a workable system. This period of DRX is configurable and may be larger than a time gap between the end of NPUSCH and the received PDCCH, and the UE may receive the DCI signalling for granting another HARQ process number before receiving the feedback of the same HARQ process transmission. Furthermore, the UE may receive the satellite information (e.g. position, velocity, etc.) and/or Global Navigation Satellite System (GNSS) information before receiving the feedback of the same HARQ process transmission.

FIG. 6 is a table summarizing the enhancements to the timing relationships in NB-IoT as described herein, according to various arrangements.

Figure 7:
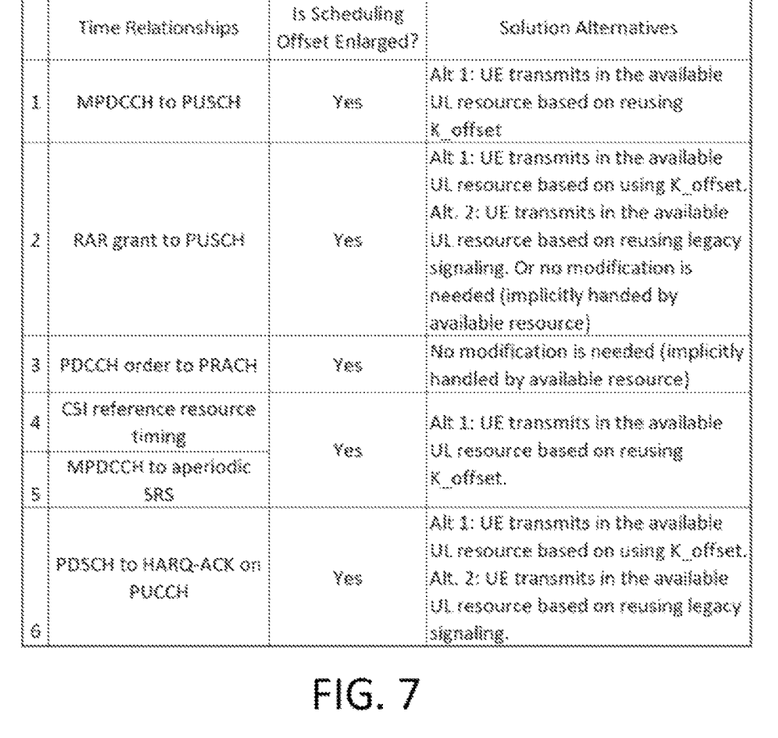
FIG. 7 is a table summarizing the enhancements to the timing relationships in eMTC as described herein, according to various embodiments.

FIG. 7 is a table summarizing the enhancements to the timing relationships in eMTC as described herein, according to various arrangements.

Figure 8A:
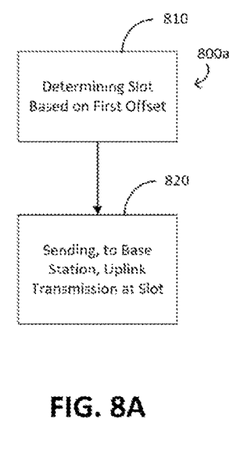
FIG. 8A is a flowchart diagram illustrating an example wireless communication method for scheduling an uplink transmission based on an offset, according to various embodiments.

FIG. 8A is a flowchart diagram illustrating an example wireless communication method 800a, according to various arrangements. Method 800a can be performed by a UE, and begins at 810 where the UE determines a slot based on a first offset. At 820, the UE sends, to a BS, a UL transmission at the slot.

In some embodiments, the method 800a further includes determining the slot to be equal to n+k+first offset or an available slot after n+k+first offset. Here, n represents a slot where the UE receives DL scheduling information from the BS that configures the UL transmission, and k represents a second offset indicated by the BS. In some of these embodiments, the determination of the slot is further based on at least a TA parameter or whether the slot is a UL resource In some embodiments, the method 800a further includes determining the first offset according to the TA parameter, which includes at least one of a common TA value indicated by the BS, a TA value determined by the UE to be applied for a UL slot for transmission, or a TA value reported from the UE to the BS. In some of these embodiments, the TA value reported is carried in at least one of a Msg 3 or NPUSCH transmission, and in other embodiments, the TA value reported is at least one of a first TA value or last TA value applied for a UL transmission carrying the TA value reported.

In other embodiments, the method 800a further includes receiving, from the BS, a signaling that indicates the first offset. In some of these embodiments, the signaling includes UE-specific signaling or a group UE signaling.

Figure 8B:
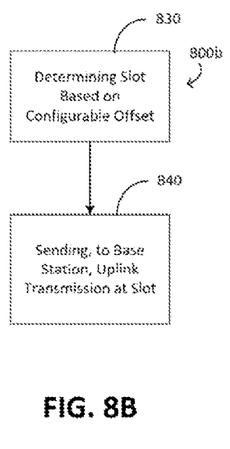
FIG. 8B is a flowchart diagram illustrating another example wireless communication method for scheduling an uplink transmission based on an offset, according to various embodiments.

FIG. 8B is a flowchart diagram illustrating an example wireless communication method 800b, according to various arrangements. Method 800b can be performed by a UE, and begins at 830 where the UE determines a slot based on a configurable offset (e.g., k'). At 840, the UE sends, to a BS, a UL transmission at the slot.

In some embodiments, the method 800b further includes determining the slot to be n+configurable offset or an available slot after n+configurable offset. Here, n represents a slot where the UE receives DL scheduling information from the BS that configures the UL transmission.

In some embodiments, the method 800b further includes determining a value for the configurable offset according to a function of the TA. The function is configured to convert a unit of the TA to one of 1 millisecond, 1 slot, or 1 frame. Here, the TA includes at least one of a common TA value indicated by the BS, a TA value determined by the UE to be applied for a UL slot for transmission, or a TA value reported from the UE to the B S. In some of these embodiments, the TA value reported is carried in at least one of a Msg 3 or NPUSCH transmission, and in other embodiments, the TA value reported is at least one of a first TA value or last TA value applied for a UL transmission carrying the TA value reported.

In other embodiments, the method 800b further includes determining the configurable offset according to an indicator in DCI or RAR grant received from the BS. In some of these other embodiments, the method 800b further includes determining the configurable offset according to the indicator and a corresponding table, with each value of the indicator corresponding to a respective value of the configurable offset.

In further embodiments, the method 800b further includes determining the configurable offset as one of a plurality of predefined values according to a table associated with a connection type of the BS.

Figure 8C:
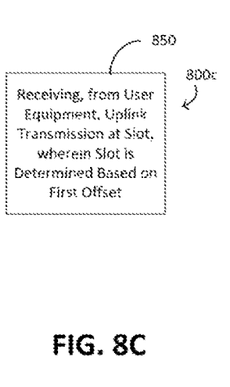
FIG. 8C is a flowchart diagram illustrating another example wireless communication method for scheduling an uplink transmission based on an offset, according to various embodiments.

FIG. 8C is a flowchart diagram illustrating an example wireless communication method 800c, according to various arrangements. Method 800c can be performed by a BS, and begins at 850 where the BS configures, for a UE, a slot for a UL transmission. The slot is determined based on a first offset.

In some embodiments, the first offset is determined according to the TA. Here, the TA includes at least one of a common TA value indicated by the BS, a TA value determined by the UE to be applied for a UL slot for transmission, or a TA value reported from the UE to the BS. In other embodiments, the method 800c further includes sending, to the UE, a signaling that indicates the first offset. Here, the signaling includes UE-specific signaling or a group UE signaling.

Figure 8D:
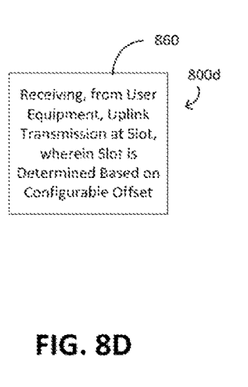
FIG. 8D is a flowchart diagram illustrating another example wireless communication method for scheduling an uplink transmission based on an offset, according to various embodiments.

FIG. 8D is a flowchart diagram illustrating an example wireless communication method 800d, according to various arrangements. Method 800d can be performed by a BS, and begins at 860 where the BS configures, for a UE, a UL transmission at a slot, which is determined based on a configurable offset (e.g., k').

In some embodiments, a value for the configurable offset is determined according to a function of the TA. The function is configured to convert a unit of the TA to one of 1 millisecond, 1 slot, or 1 frame. Here, the TA includes at least one of a common TA value indicated by the B S, a TA value determined by the UE to be applied for a UL slot for transmission, or a TA value reported from the UE to the BS.

In other embodiments, the method 800d further includes sending, to the UE, an indicator in DCI or RAR grant and applying the indicator to a table to determine the configurable offset. Each value of the indicator corresponds to a respective value of the configurable offset. In further embodiments, the method 800d further includes determining the configurable offset as one of a plurality of predefined values according to a table associated with a connection type of the BS.

Figure 9A:
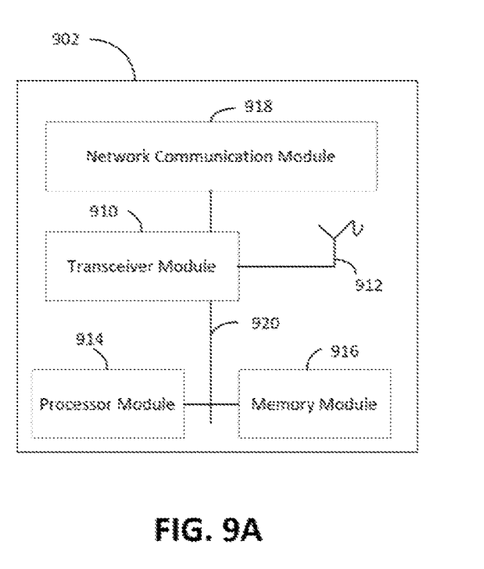
FIG. 9A illustrates a block diagram of an example base station, according to various embodiments.
Figure 9B:
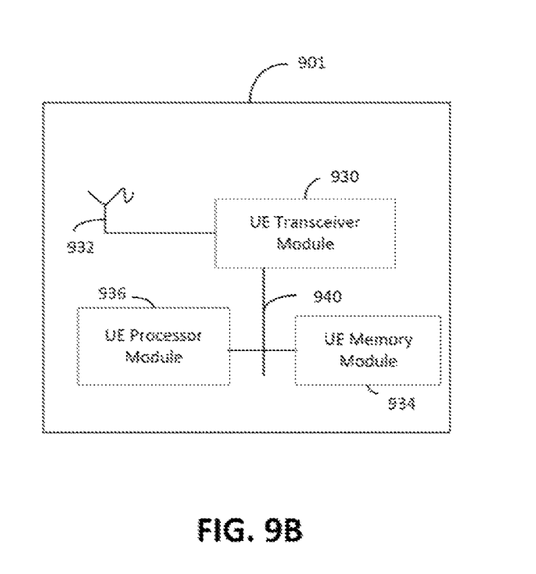
FIG. 9B illustrates a block diagram of an example user equipment, according to various embodiments.

FIG. 9A illustrates a block diagram of an example BS 902, in accordance with some embodiments of the present disclosure. FIG. 9B illustrates a block diagram of an example UE 901, in accordance with some embodiments of the present disclosure. The UE 901 (e.g., a wireless communication device, a terminal, a mobile device, a mobile user, and so on) is an example implementation of the UEs described herein, and the BS 902 is an example implementation of the BS described herein.

The BS 902 and the UE 901 can include components and elements configured to support known or conventional operating features that need not be described in detail herein. In one illustrative embodiment, the BS 902 and the UE 901 can be used to communicate (e.g., transmit and receive) data symbols in a wireless communication environment, as described above. For instance, the BS 902 can be a BS (e.g., gNB, eNB, and so on), a server, a node, or any suitable computing device used to implement various network functions.

The BS 902 includes a transceiver module 910, an antenna 912, a processor module 914, a memory module 916, and a network communication module 918. The module 910, 912, 914, 916, and 918 are operatively coupled to and interconnected with one another via a data communication bus 920. The UE 901 includes a UE transceiver module 930, a UE antenna 932, a UE memory module 934, and a UE processor module 936. The modules 930, 932, 934, and 936 are operatively coupled to and interconnected with one another via a data communication bus 940. The BS 902 communicates with the UE 901 or another BS via a communication channel, which can be any wireless channel or other medium suitable for transmission of data as described herein.

As would be understood by persons of ordinary skill in the art, the BS 902 and the UE 901 can further include any number of modules other than the modules shown in FIGS. 9A and 9B. The various illustrative blocks, modules, circuits, and processing logic described in connection with the embodiments disclosed herein can be implemented in hardware, computer-readable software, firmware, or any practical combination thereof. To illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. The embodiments described herein can be implemented in a suitable manner for each particular application, but any implementation decisions should not be interpreted as limiting the scope of the present disclosure.

In accordance with some embodiments, the UE transceiver 930 includes a radio frequency (RF) transmitter and a RF receiver each including circuitry that is coupled to the antenna 932. A duplex switch (not shown) may alternatively couple the RF transmitter or receiver to the antenna in time duplex fashion. Similarly, in accordance with some embodiments, the transceiver 910 includes an RF transmitter and a RF receiver each having circuitry that is coupled to the antenna 912 or the antenna of another B S. A duplex switch may alternatively couple the RF transmitter or receiver to the antenna 912 in time duplex fashion. The operations of the two-transceiver modules 910 and 930 can be coordinated in time such that the receiver circuitry is coupled to the antenna 932 for reception of transmissions over a wireless transmission link at the same time that the transmitter is coupled to the antenna 912. In some embodiments, there is close time synchronization with a minimal guard time between changes in duplex direction.

The UE transceiver 930 and the transceiver 910 are configured to communicate via the wireless data communication link, and cooperate with a suitably configured RF antenna arrangement 912/932 that can support a particular wireless communication protocol and modulation scheme. In some illustrative embodiments, the UE transceiver 930 and the transceiver 910 are configured to support industry standards such as the Long Term Evolution (LTE) and emerging 5G standards, and the like. It is understood, however, that the present disclosure is not necessarily limited in application to a particular standard and associated protocols. Rather, the UE transceiver 930 and the BS transceiver 910 may be configured to support alternate, or additional, wireless data communication protocols, including future standards or variations thereof.

The transceiver 910 and the transceiver of another B S (such as but not limited to, the transceiver 910) are configured to communicate via a wireless data communication link, and cooperate with a suitably configured RF antenna arrangement that can support a particular wireless communication protocol and modulation scheme. In some illustrative embodiments, the transceiver 910 and the transceiver of another BS are configured to support industry standards such as the LTE and emerging 5G standards, and the like. It is understood, however, that the present disclosure is not necessarily limited in application to a particular standard and associated protocols. Rather, the transceiver 910 and the transceiver of another BS may be configured to support alternate, or additional, wireless data communication protocols, including future standards or variations thereof.

In accordance with various embodiments, the BS 902 may be a BS such as but not limited to, an eNB, a serving eNB, a target eNB, a femto station, or a pico station, for example. The BS 902 can be an RN, a DeNB, or a gNB. In some embodiments, the UE 901 may be embodied in various types of user devices such as a mobile phone, a smart phone, a personal digital assistant (PDA), tablet, laptop computer, wearable computing device, etc. The processor modules 914 and 936 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the method or algorithm disclosed herein can be embodied directly in hardware, in firmware, in a software module executed by processor modules 914 and 936, respectively, or in any practical combination thereof. The memory modules 916 and 934 may be realized as RAM memory, flash memory, ROM memory, EPROM memory, EEPROM memory, registers, a hard disk, a removable disk, a CD-ROM, or any other form of storage medium known in the art. In this regard, memory modules 916 and 934 may be coupled to the processor modules 914 and 936, respectively, such that the processors modules 914 and 936 can read information from, and write information to, memory modules 916 and 934, respectively. The memory modules 916 and 934 may also be integrated into their respective processor modules 914 and 936. In some embodiments, the memory modules 916 and 934 may each include a cache memory for storing temporary variables or other intermediate information during execution of instructions to be executed by processor modules 914 and 936, respectively. Memory modules 916 and 934 may also each include non-volatile memory for storing instructions to be executed by the processor modules 914 and 936, respectively.

The network communication module 918 generally represents the hardware, software, firmware, processing logic, and/or other components of the BS 902 that enable bi-directional communication between the transceiver 910 and other network components and communication nodes in communication with the BS 902. For example, the network communication module 918 may be configured to support internet or WiMAX traffic. In a deployment, without limitation, the network communication module 918 provides an 502.3 Ethernet interface such that the transceiver 910 can communicate with a conventional Ethernet based computer network. In this manner, the network communication module 918 may include a physical interface for connection to the computer network (e.g., Mobile Switching Center (MSC)). In some embodiments, the network communication module 918 includes a fiber transport connection configured to connect the BS 902 to a core network. The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method, comprising:
receiving, by a user equipment (UE) from a base station (BS), a signaling indicating a first offset;
determining, by the UE, a slot based on the first offset; and
sending, by the UE to the BS, an uplink transmission at the slot,
wherein the UE is not required to monitor an NPDCCH candidate in any subframe starting from subframe n+k−2+the first offset to subframe n+k−1+the first offset,
wherein n represents a slot where the UE receives downlink scheduling information from the BS that configures the uplink transmission, and k represents a second offset indicated by the BS,
wherein the slot is determined to be (n+k+first offset).

2. The wireless communication method of claim 1, wherein the determination of the slot is further based on at least a Timing Advance (TA) parameter or whether the slot is an uplink resource.

3. The wireless communication method of claim 1, wherein the signaling includes at least one of: a UE-specific signaling or a group UE signaling.

4. The wireless communication method of claim 1, wherein the first offset comprises a configurable offset.

5. A wireless communication method, comprising:
configuring, by a base station (BS) for a user equipment (UE), a slot for an uplink transmission;
wherein the slot is determined based on a first offset,
wherein the UE is not required to monitor an NPDCCH candidate in any subframe starting from subframe n+k−2+the first offset to subframe n+k−1+the first offset,
wherein n represents a slot where the UE receives downlink scheduling information from the BS that configures the uplink transmission, and k represents a second offset indicated by the BS,
wherein the slot is determined to be (n+k+first offset).

6. The wireless communication method of claim 5, wherein the determination of the slot is further based on at least a Timing Advance (TA) parameter or whether the slot is an uplink resource.

7. The wireless communication method of claim 5, wherein the first offset comprises a configurable offset.

8. A user equipment (UE), comprising:
a memory and at least one processor, wherein the at least one processor is configured to read code from the memory to implement operations of:
receive a signaling indicating a first offset from a base station (BS);
determine a slot based on the first offset; and
send, via a transmitter to the BS, an uplink transmission at the slot,
wherein the UE is not required to monitor an NPDCCH candidate in any subframe starting from subframe n+k−2+the first offset to subframe n+k−1+the first offset,
wherein n represents a slot where the UE receives downlink scheduling information from the BS that configures the uplink transmission, and k represents a second offset indicated by the BS,
wherein the slot is determined to be (n+k+first offset).

9. The UE of claim 8, wherein the determination of the slot is further based on at least a Timing Advance (TA) parameter or whether the slot is an uplink resource.

10. The UE of claim 8, wherein the signaling includes at least one of: a UE-specific signaling or a group UE signaling.

11. The UE of claim 8, wherein the first offset comprises a configurable offset.

12. A base station (BS), comprising:
a memory and at least one processor, wherein the at least one processor is configured to read code from the memory to implement operations of:
configure, for a user equipment (UE), a slot for an uplink transmission;
wherein the slot is determined based on a first offset, wherein the UE is not required to monitor an NPDCCH candidate in any subframe starting from subframe n+k−2+the first offset to subframe n+k−1+the first offset, wherein n represents a slot where the UE receives downlink scheduling information from the BS that configures the uplink transmission, and k represents a second offset indicated by the BS, wherein the subframe is determined to be (n+k+first offset).

13. The BS of claim 12, wherein the determination of the slot is further based on at least a Timing Advance (TA) parameter or whether the slot is an uplink resource.

14. The BS of claim 12, wherein the first offset comprises a configurable offset.

* * * * *